United States Patent [19]

McSweeney

[11] 4,309,295
[45] Jan. 5, 1982

[54] GRAIN BOUNDARY BARRIER LAYER CERAMIC DIELECTRICS AND THE METHOD OF MANUFACTURING CAPACITORS THEREFROM

[75] Inventor: Robert T. McSweeney, Valencia, Calif.

[73] Assignee: U.S. Philips Corporation, New York, N.Y.

[21] Appl. No.: 120,113

[22] Filed: Feb. 8, 1980

[51] Int. Cl.³ .................. H01B 1/08; C04B 35/46; C04B 35/50; H01L 21/38
[52] U.S. Cl. .................. 252/62.3 BT; 252/62.3 R; 428/697; 427/80; 501/136
[58] Field of Search ............... 106/73.2; 252/62.3 R, 252/62.3 BT, 520, 521; 428/539; 357/10; 427/80

[56] References Cited

U.S. PATENT DOCUMENTS 3,933,668 1/1976 Takahashi et al. ............... 106/73.3
4,143,207 3/1979 Itakura et al. .................... 106/73.2
4,149,173 4/1979 Schmelz et al. .................. 357/10

FOREIGN PATENT DOCUMENTS 50-27994 3/1975 Japan ............... 252/62.3 BT

Primary Examiner—Helen M. McCarthy
Assistant Examiner—Mark Bell
Attorney, Agent, or Firm—Marc D. Schechter

[57] ABSTRACT

A major amount of strontium titanate is modified with additions of lanthanide series rare earth aluminates, titanates and transition metal oxides to provide sintered semiconductive ceramics with enhanced temperature and voltage stability. The modified strontium titanate ceramic, having the general formula:

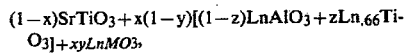

is coated with a fritted electrode material and fired at a temperature below the melting point of the electrode material to cause the frit to diffuse into the ceramic and form insulating boundaries around the ceramic grains. Ceramic capacitors so formed are characterized by their excellent electrical properties, particularly their improved temperature stability as evidenced by extremely low changes in capacitance with temperature.

13 Claims, No Drawings

GRAIN BOUNDARY BARRIER LAYER CERAMIC DIELECTRICS AND THE METHOD OF MANUFACTURING CAPACITORS THEREFROM

BACKGROUND OF THE INVENTION

The present invention relates to grain boundary barrier layer ceramic capacitors in which the surfaces of the individual grains of a ceramic semiconductor are insulated with a layer of nonconductive material which is diffused into the ceramic.

Grain boundary barrier layer ceramic capacitors (also referred to as internal or intergranular barrier layer ceramics) are well known in the art. The material systems for such capacitors are typically based on barium titanate ($BaTiO_3$) or strontium titanate ($SrTiO_3$). The base materials are doped with additions of various transition metals and rare earth elements to promote grain growth and enhance the semiconductivity in the base ceramic material. Additionally, these dopants improve various electrical properties of the capacitors utilizing these material systems. The sintered semiconductive ceramic body is subsequently treated by diffusing an insulating material into the ceramic body to provide continuous insulating boundaries around the semiconductive ceramic grains.

Grain boundary barrier layer ceramics based on barium titanate are disclosed in U.S. Pat. Nos. 3,473,958 and 3,569,802. Barium titanate is an attractive base material because of its high dielectric constant, however, it suffers from the disadvantage of having a Curie peak within the typical range of capacitor operating temperatures and, as a result, other electrical properties, such as resistivity, are poor or difficult to control.

Strontium titanate, though having a lower dielectric constant than barium titanate, has more recently been found to provide an excellent base material for grain boundary barrier layer ceramic capacitors. Strontium titanate exhibits a Curie peak outside the temperature range of interest and its systems can be used to provide capacitors which exhibit an improvement over barium titanate capacitors in such properties as dissipation factor, resistivity and breakdown voltage. Examples of material systems for strontium titanate grain boundary barrier layer capacitors are disclosed in U.S. Pat. No. 3,933,668 and published Japanese patent application No. 76-143900 (Application No. 75-68699, filed June 6, 1975).

Capacitors made from various modifications of the strontium titanate system disclosed in U.S. Pat. No. 3,933,668 exhibit a change in capacitance from the room temperature value, over the range of $-30°$ C. to $+85°$ C., as low as 15%. However, the actual maximum range of temperatures over which the industry typically measures changes in capacitance is $-55°$ C. to $+125°$ C. Over this range, the change in capacitance of the capacitors disclosed in the above identified patent would be approximately 24% (from $-12\%$ at $-55°$ C. to $+12\%$ at $+125°$ C.). This amount of change is unacceptable for many applications. The above identified published Japanese patent application No. 76-143900 discloses modified strontium titanate grain boundary barrier layer capacitors with an optimum capacitance change of $+9\%$ to $-8\%$ (17% total change) in the temperature range of $-30°$ C. to $+80°$ C. Again, however, over the maximum range of interest of $-55°$ C. to $+125°$ C., the change will likely be substantially greater than that disclosed. Good temperature stability is, therefore, not provided by either of the foregoing material systems.

It is also known to modify strontium titanate used in making grain boundary barrier layer capacitors by doping the ceramic material with lanthanide series rare earths. The lanthanum acts as a donor dopant to render the strontium titanate semiconductive. The previously mentioned Japanese patent application discloses such an addition in very small amounts ranging from 0.02 to 0.36 mole %. The upper limit on the lanthanum addition is identified as being critical, with amounts in excess of 0.36 mole % reported to adversely affect various properties of the capacitor. It is well known, however, that low concentrations of donor dopants in a composition are difficult to control and usually require the use of high purity raw materials. Otherwise, small concentrations of impurities in the raw or precursor materials may contaminate the dopant and substantially diminish or negate its intended effects.

As mentioned previously, it is desirable to insulate the grain boundaries of the doped sintered ceramics by a subsequent diffusion treatment at sub-sintering temperatures. Such a diffusion treatment is disclosed in U.S. Pat. No. 3,933,668, discussed above. However, the temperatures at which this insulating diffusion treatment is accomplished range from 1000° to 1300° C., thus preventing the application of silver or other low melting point electrode materials until after the diffusion treatment. This, of course, requires an additional process step.

SUMMARY OF THE INVENTION

In the present invention, semiconductive ceramics based on strontium titanate ($SrTiO_3$) are modified with 2 to 6 mole % of a linear combination of ingredients consisting of lanthanum aluminate ($LaAlO_3$), other lanthanide series rare earth aluminates, and/or rare earth titanates ($Ln_{0.66}TiO_3$). Substitutions of $LaCrO_3$ or other double metal oxides based on lanthanide oxide and a transition metal oxide can be made for up to 50% of the above 2 to 6 mole % linear combination. These materials are sintered in a reducing atmosphere to provide dense semiconductive ceramics. The relatively higher concentrations of dopants permit the use of less expensive, commercial grade prereacted strontium titanate.

The sintered ceramics are heat treated to diffuse therein a grain boundary insulating material, preferably comprising bismuth oxide ($Bi_2O_3$). The diffusion treatment may be carried out at temperatures as low as 850° C. such that the diffusant can be applied as a frit in a low melting point electrode material, such as silver.

Capacitors having excellent dielectric properties are produced from the foregoing method and materials, including high effective dielectric constants, low dissipation factors, high insulation resistivities and dielectric relaxation time, and maximum changes in capacitance with temperature over the range of $-55°$ to $+125°$ C. as low as $\pm 2\%$.

DESCRIPTION OF THE PREFERRED EMBODIMENTS

Grain boundary barrier layer ceramic capacitors were prepared from a $SrTiO_3$ base composition having the formula:

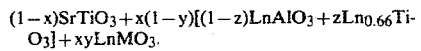

In this formula, the symbol Ln represents one of the lanthanide series rare earths (atomic numbers 57-71) and yttrium (Y); and M represents a transition metal from the group comprising vanadium (V), chromium (Cr), manganese (Mn), iron (Fe), cobalt (Co), nickel (Ni), copper (Cu), niobium (Nb), molybdenum (Mo), tantalum (Ta) and tungsten (W). The parameters x, y and z define the mole fraction additions to the $SrTiO_3$, as follows: x is the total mole fraction of the $SrTiO_3$ which is replaced by one or more of the modifiers or dopants represented by the formulas $LnAlO_3$, $Ln_{0.66}TiO_3$ and $LnMO_3$; and y and z specify how the total mole fraction, x, is divided among the three modifiers.

EXAMPLE 1

96 mole % of $SrTiO_3$ was prepared using reagent grade precursors $SrCO_3$ and $TiO_2$. 4 mole % of $LaAlO_3$ and/or $La_{0.66}TiO_3$ was added in the basic oxide forms, $La_2O_3$, $Al_2O_3$ and $TiO_2$ to form three different compositions. The blended material was pressed into discs which were sintered in a reducing atmosphere having partial oxygen pressures in the range of $10^{-7.6}$ to $10^{-8.2}$ atmospheres at various temperatures. The sintered discs were then coated with a silver electrode paint containing a frit comprising 84 weight % $Bi_2O_3$ and 14 weight % CdO and fired in air at 900° C. for 4 to 16 hours to diffuse the frit into the discs to insulate the ceramic grains. Table 1 identifies the specimens by the compositional parameters according to the above defined formula and sintering temperatures, and lists the measured dielectric properties.

TABLE 1

| | $SrTiO_3$ modified with $LaAlO_3$ and $La_{.66}TiO_3$ | | | | | | |
|---|---|---|---|---|---|---|---|
| Sample No. | Parameter | | | Sintering Temp. (°C.) | K | D (%) | T @ 25v (Sec.) | ΔC/C (%) −55 to +125° C. |
| | x | y | z | | | | | |
| 1 | .04 | 0 | 0 | 1450 | 63,000 | 0.40 | 330 | +1.0, −2.0 |
| 2 | .04 | 0 | 0 | 1480 | 66,000 | 0.60 | 260 | −1.0, +0.5 |
| 3 | .04 | 0 | 1.0 | 1480 | 35,000 | 0.30 | 670 | −1.7, 0.0 |
| 4 | .04 | 0 | .50 | 1420 | 22,000 | 0.16 | 300 | ±1.5 |

K - dielectric constant
D - dissipation factor
T - dielectric relaxation time
ΔC/C - maximum change in capacitance with temperature From Table 1, it can be seen that, although excellent dielectric properties were quite uniformly attained, somewhat high sintering temperatures were required. Furthermore, more expensive reagent grade precursors were used to prepare the $SrTiO_3$.

A more cost effective process suggests the use of commercially available, prereacted $SrTiO_3$. Compositions identical to those shown in Table 1 were prepared using fully reacted $SrTiO_3$. However, under similar firing condition, only the composition identical to Sample No. 4 of Table 1 provided comparable dielectric properties.

EXAMPLE 2

To 96 mole % fully reacted $SrTiO_3$ was added $LaAlO_3$ and $La_{0.66}TiO_3$, as in Example 1, but with the further compositional addition of $LaCrO_3$, using its precursor compounds $La_2O_3$ and $Cr_2O_3$. Three separate compositions, identified in Table 2 by their parameters in the basic formula, were blended, formed into discs, and fired at 1380° C. for two hours at an oxygen partial pressure of $10^{-8.5}$ atmosphere. The sintered discs were diffusion treated in the same manner as the Example 1 specimens. Table 2 lists the measured dielectric properties of the capacitors so formed.

TABLE 2

| | $SrTiO_3$ modified with $LaAlO_3$, $La_{.66}TiO_3$ and $LaCrO_3$ (4 mole %) | | | | | | | |
|---|---|---|---|---|---|---|---|---|
| Sample No. | Parameter | | | K | D (%) | T@25v (sec.) | ΔC/C (%) −55 to +125° C. | R@25v (ohms) |
| | x | y | z | | | | | |
| 5 | .04 | .065 | .50 | 20,000 | 0.45 | 575 | +2.0, −1.0 | $2.3(10^{10})$ |
| 6 | .04 | .13 | .50 | 17,000 | 0.53 | 640 | +2.5, −1.0 | $3.0(10^{10})$ |
| 7 | .04 | .20 | .50 | 18,000 | 0.47 | 675 | ±1.5 | $3.0(10^{10})$ |

R - resistance

The chromate modification (in the form of $LaCrO_3$) was particularly significant in reducing the sintering temperature by as much as 50° C. from those temperatures required for the Example 1 specimens. In addition, although there was a reduction in the dielectric constants (K), these values are still very good, and the other measured properties were as good or slightly improved. The overall dielectric properties improved with additions up to 0.8 mole % $LaCrO_3$; i.e., $xy=0.04(0.20)(100\%)=0.8\%$.

Additional compositions were prepared and tested to determine the effects of other variations in the compositional parameters x, y and z in the basic formula, as well as the effects of substitutions of other rare earth elements for lanthanum (La) and other transition metals for chromium (Cr). The following Examples 3-9 cover compositions prepared in the same manner, formed into discs of identical dimensions (0.045 cm. thick × 1.2 cm. diameter), sintered at temperatures of 1400° to 1430° C. in a reducing atmosphere having an oxygen partial pressure of $10^{-9.5}$ to $10^{-8.5}$, and diffusion treated at temperatures ranging from 900° C. to 935° C. using the bismuth oxide based frit in a silver electrode material.

EXAMPLE 3

To examine the lower limit of total modifier concentrations of 2 mole % (x=0.02) in the basic formula, samples were prepared with no chromate additions (y=0) and with titanate additions varied over the full range of z=0 to 1.0. The samples were sintered and diffusion treated to provide grain boundary insulation as specified in the preceding paragraph. The specific sintering conditions, which were varied for each group of identical samples, and the measured dielectric properties are shown in Table 3.

TABLE 3

.98SrTiO$_3$ + .02[(1-z)LaAlO$_3$ + zLa$_{.66}$TiO$_3$]

| Sample No. | z | Sintering Conditions* | K | D (%) | T @ 50v | ΔC/C |
|---|---|---|---|---|---|---|
| 8 | 0 | A | 18,450 | 0.63 | 164 | +6, −5 |
| 9 | 0 | B | 17,600 | 0.43 | 120 | +9, −7 |
| 10 | 0 | C | 15,600 | 0.32 | 350 | +7, −4 |
| 11 | .25 | A | 15,100 | 0.55 | 270 | +6, −5 |
| 12 | .25 | B | 17,000 | 0.46 | 150 | +9, −8 |
| 13 | .25 | C | 17,600 | 0.32 | 195 | +6, −4 |
| 14 | .50 | A | 13,000 | 0.59 | 290 | ±4 |
| 15 | .50 | B | 14,400 | 0.48 | 160 | ±8 |
| 16 | .50 | C | 21,150 | 0.78 | 380 | +6, −4 |
| 17 | .75 | A | 11,700 | 0.55 | 50 | +3, −4 |
| 18 | .75 | B | N.T.** | — | — | — |
| 19 | .75 | C | 23,200 | 1.25 | 1 | +5, −3 |
| 20 | 1.0 | A | N.T. | — | — | — |
| 21 | 1.0 | B | N.T. | — | — | — |
| 22 | 1.0 | C | 8,800 | 0.43 | 4 | ±5 |

| *Sintering Conditions | Temp.(°C.) | Atmosphere (P$_{O2}$) |
|---|---|---|
| A | 1,430 | 10$^{-8.5}$ |
| B | 1,400 | 10$^{-8.5}$ |
| C | 1,400 | 10$^{-9.5}$ |

**N.T. - No measurements taken

Referring to the data in Table 3, it is apparent that with a 2 mole % addition of only LaAlO$_3$ in the strontium titanate, good dielectric properties are obtained. The dielectric constants (K) and dissipation factors (D) in Sample Nos. 8–10 are very good, but the dielectric relaxation times (T) and changes in capacitance with temperature are somewhat deficient. The overall dielectric properties remain good as La$_{0.66}$TiO$_3$ is substituted for LaAlO$_3$ up to 50% (z=0.50). Increasing concentrations of the titanate addition, in Sample Nos. 17–22, have significant adverse effects, as evidenced principally by poor sintering and low dielectric relaxation times. Although titanate additions do enhance sintering and grain growth, the reduced concentrations of aluminate, particularly at the already low 2 mole % total modifier addition, result in exaggerated grain growth and produce a duplex microstructure not conducive to the development of high resistivity. Low dielectric relaxation times are therefore noted in these compositions.

EXAMPLE 4

Samples with 6 mole % total modifiers, representing the upper limit of x in the basic formula, were prepared. The chromate addition (LaCrO$_3$) was varied over the full range of the disclosed y parameter and the titanate and aluminate additions at z=0.50 varied correspondingly from 1.5 to 3 mole %. The specimens were sintered and diffusion treated for grain boundary insulation in the same manner. Table 4 lists the measured dielectric properties.

TABLE 4

.94 SrTiO$_3$ + .06(1 − y)[.50LaAlO$_3$ + .05La$_{.66}$TiO$_3$] + .06yLaCrO$_3$

| Sample No. | y | Sintering Conditions* | K | D (%) | T | ΔC/C |
|---|---|---|---|---|---|---|
| 23 | 0 | A | 680 | 3.50 | — | — |
| 24 | 0 | B | — | — | — | — |
| 25 | 0 | C | 520 | 5.90 | — | — |
| 26 | .065 | A | 920 | 1.45 | 400 | — |
| 27 | .065 | B | 490 | 7.1 | 2 | — |
| 28 | .065 | C | 2,000 | 2.0 | 660 | — |
| 29 | .13 | A | 2,800 | 0.60 | 220 | — |
| 30 | .13 | B | 1,000 | 2.15 | 40 | — |
| 31 | .13 | C | 3,900 | 1.4 | 700 | — |
| 32 | .20 | A | 6,000 | 0.32 | 1,040 | — |
| 33 | .20 | B | 6,000 | 0.26 | 530 | — |
| 34 | .20 | C | 8,900 | 0.90 | 400 | — |
| 35 | .30 | A | 12,700 | 0.25 | 280 | +5, −3 |
| 36 | .30 | B | 13,500 | 0.24 | 300 | +5, −3 |
| 37 | .30 | C | 8,600 | 0.90 | 600 | +8, −4 |
| 38 | .40 | A | 20,200 | 0.40 | 270 | ±1 |
| 39 | .40 | B | 14,900 | 0.22 | 130 | ±3 |
| 40 | .40 | C | 20,000 | 0.37 | 270 | ±2 |
| 41 | .50 | A | 17,800 | 0.54 | 120 | — |
| 42 | .50 | B | 18,400 | 0.22 | 330 | — |
| 43 | .50 | C | 17,800 | 0.54 | 120 | — |

*Per Table 3

The dielectric measurements shown in Table 4 disclose relatively low dielectric constants (K) and high dissipation factors (D) at lower concentrations of the chromate modifier. Measurements of changes in capacitance with temperature were not made on these low K specimens. Examination of the specimens showed limited grain growth in the lower K specimens. The higher chromate additions are responsible for the promotion of grain growth in the strontium titanate as evidenced by the higher dielectric constants in, for example, Sample Nos. 35–43. The maximum changes in capacitance with temperature are also excellent in these specimens, especially Sample Nos. 38–40.

EXAMPLE 5

In order to more thoroughly examine the effects of an absence of the chromate modifier in the mid-range of total mole fraction additions (i.e. with x=0.04), the samples listed in Table 5 were prepared and tested in the same manner as those of Examples 3 and 4. No chromate additions were made and the constant 4 mole % total modifiers were varied from all LaAlO$_3$ (z=0) to all La$_{0.66}$TiO$_3$ (z=1.00).

TABLE 5

.96SrTiO$_3$ + .04[(1 − z)LaAlO$_3$ + zLa$_{.66}$TiO$_3$]

| Sample No. | z | Sintering Conditions | K | D | T | ΔC/C |
|---|---|---|---|---|---|---|
| 44 | 0 | A | 8,700 | 2.1 | 290 | +12, −4 |
| 45 | 0 | B | N.T.* | — | — | — |
| 46 | 0 | C | N.T.* | — | — | — |
| 47 | .25 | A | 9,600 | 1.0 | 210 | +5, −2 |
| 48 | .25 | B | N.T. | — | — | — |
| 49 | .25 | C | 14,200 | 1.30 | 124 | +9, −2 |
| 50 | .50 | A | 19,400 | 0.47 | 130 | +2, −1 |
| 51 | .50 | B | 11,200 | 0.53 | 100 | +8, −4 |
| 52 | .50 | C | 16,000 | 0.81 | 280 | +5, −2 |
| 53 | .75 | A | 15,000 | 1.00 | 167 | ±1 |
| 54 | .75 | B | 14,100 | 0.53 | 310 | +4, −3 |
| 55 | .75 | C | 13,800 | 0.81 | 300 | ±1 |
| 56 | 1.00 | A | 8,800 | 0.28 | 38 | +1, −2 |
| 57 | 1.00 | B | 11.160 | 0.53 | 50 | — |
| 58 | 1.00 | C | 14,600 | 0.73 | 50 | +6, −2 |

*N.T. - No measurements taken

As may be clearly seen from Table 5, the absence of the chromate modifier in the high aluminate specimens (Sample Nos. 44–49) has a substantial adverse effect on the dielectric properties. The grain growth in Sample Nos. 45, 46 and 48 was, in fact, insufficient to provide dielectric enhancement, consequently no dielectric measurements were made. However, with increasing concentrations of the titanate modifier, $La_{0.66}TiO_3$, up to and including values of $z=0.75$, significant increases in the dielectric constants are noted. This suggests that the titanate modifier will promote good grain growth in the absence of the chromate modifier. In addition, Sample Nos. 50–55 exhibited very good overall properties, particularly the small changes in capacitance with temperature. It should also be pointed out, however, that, in the total absence of aluminate and chromate modifiers (at $z=1.00$), the overall dielectric properties were somewhat poorer, as shown in Sample Nos. 56–58, again, as in Example 3, due to exaggerated grain growth and the presence of a duplex microstructure, characterized by widely differing grain sizes. Much improved dielectric properties were obtained in the high aluminate compositions by doubling the residence time at the sintering temperature. In this case, all properties of samples comparable to Samples 44–49 were equivalent or better than those noted at $z=0.50$ (Samples 50–52), except that the maximum changes in capacitance with temperature were worse than $+11\%$ to $-5\%$ over the temperature range of interest.

EXAMPLE 6

To examine the effects of the addition of the chromate modifiers at the 4 mole % total modifier content, specimens similar to those of Example 5 were prepared, but with $LaCrO_3$ included as a constant 0.8 mole % substitution for part of the $LaAlO_3$ (i.e. $y=0.20$). The titanate modifier was varied, as in Example 5, over the full range of z. The results are shown in Table 6.

TABLE 6

$.96SrTiO_3 + .032[(1 − z)LaAlO_3 + zLa_{.66}TiO_3] + .008LaCrO_3$

| Sample No. | z | Sintering Conditions* | K | D | T | ΔC/C |
|---|---|---|---|---|---|---|
| 59 | 0 | A | 15,800 | 0.23 | 350 | +5, −2 |
| 60 | 0 | B | 2,300 | 4.60 | 1 | — |
| 61 | 0 | C | 15,800 | 1.40 | 35 | — |
| 62 | .25 | A | 13,400 | 0.25 | 300 | +3, −2 |
| 63 | .25 | B | 15,400 | 0.10 | 340 | +7, −4 |
| 64 | .25 | C | 19,000 | 0.22 | 340 | +3, −2 |
| 65 | .50 | A | 16,600 | 0.33 | 260 | ±1 |
| 66 | .50 | B | 12,500 | 0.21 | 560 | +3, −2 |
| 67 | .50 | C | 16,000 | 0.22 | 350 | +2, −1 |
| 68 | .75 | A | 8,800 | 0.43 | 200 | ±2 |
| 69 | .75 | B | 12,300 | 0.31 | 30 | — |
| 70 | .75 | C | 11,000 | 0.83 | 2 | — |
| 71 | 1.00 | A | 9,500 | 0.41 | 60 | ±4 |
| 72 | 1.00 | B | 7,200 | 0.24 | 160 | — |
| 73 | 1.00 | C | 25,000 | 1.53 | 40 | — |

The best overall dielectric properties are exhibited in Sample Nos. 65–67. Uniformly good results were obtained in these samples at each of the three different sintering conditions. Comparing the Table 6 results with those of the preceding examples, an optimum composition for the basic formula appears to be established at $x=0.04$, $y=0.20$ and $z=0.50$. The significant benefits of the chromate addition may be seen by comparing the properties of Sample Nos. 65–67 with those of the similar Sample Nos. 50–52 of Table 5 but containing no chromate modifier. The slight decrease in the dielectric constants in Sample Nos. 65–67 is insignificant in relation to the substantial improvements in all other properties measured. Referring to Sample Nos. 59–61, it is noted that the high aluminate content ($z=0$) appears to make the samples difficult to sinter, except at the higher sintering temperature of 1430° C. in Sample No. 59 where good properties were obtained.

EXAMPLE 7

Samples were prepared with 4 mole % total modifiers with variations in the chromate addition covering the full range of $y=0$ to 0.50. The z parameter, indicating the mole fraction substitution of titanate for aluminate was maintained at 0.50, the optimum value as previously indicated. The results shown in the following Table 7 include, for purposes of easier comparison, the data for Samples 50–52 from Table 5 and Samples 65–67 from Table 6.

TABLE 7

$.96SrTiO_3 + .04(1-y)[.50LaAlO_3 + .50La_{.66}TiO_3] + .04yLaCrO_3$

| Sample No. | y | Sintering Conditions* | K | D | T | ΔC/C |
|---|---|---|---|---|---|---|
| 50 | 0 | A | 19,400 | 0.50 | 130 | +2, −1 |
| 51 | 0 | B | 11,200 | 0.53 | 100 | +8, −4 |
| 52 | 0 | C | 16,000 | 0.81 | 280 | +5, −2 |
| 74 | .065 | A | 14,600 | 0.80 | 30 | — |
| 75 | .065 | B | 10,500 | 1.60 | 140 | +3, −4 |
| 76 | .065 | C | 20,000 | 0.50 | 90 | +3, −1 |
| 77 | .13 | A | 21,000 | 1.00 | 30 | — |
| 78 | .13 | B | 17,600 | 0.37 | 230 | +3, −2 |
| 79 | .13 | C | 21,600 | 0.50 | 100 | ±1 |
| 65 | .20 | A | 16,600 | 0.33 | 260 | ±1 |
| 66 | .20 | B | 12,500 | 0.21 | 560 | +3, −2 |
| 67 | .20 | C | 16,000 | 0.22 | 350 | +2, −1 |
| 80 | .30 | A | 18,800 | 1.50 | 40 | — |
| 81 | .30 | B | 17,000 | 0.40 | 190 | +6, −4 |
| 82 | .30 | C | 24,000 | 0.66 | 40 | ±1 |
| 83 | .40 | A | 16,000 | 1.63 | 35 | — |
| 84 | .40 | B | 15,800 | 1.36 | 35 | +7, −9 |
| 85 | .40 | C | 22,700 | 2.0 | 3 | +1, −4 |
| 86 | .50 | A | 14,800 | 0.31 | 330 | — |
| 87 | .50 | B | 3,600 | 0.65 | 640 | +6, −5 |
| 88 | .50 | C | 3,900 | 0.40 | 860 | — |

The best properties are clearly those of Sample Nos. 65–67, confirming the optimum value for the chromate addition of $y=0.20$ established in Example 6. Certain of the Table 7 specimens exhibiting poor (low) dielectric relation times (T), but otherwise good properties, e.g. Sample Nos. 74, 76, 77 and 84 were further examined. It was determined that insufficient diffusion of the grain boundary insulating material occurred in the post-sintering heat treatment. It is believed that a slightly more intense or additional diffusion treatment would improve these properties and provide suitable capacitors.

EXAMPLE 8

To examine the efficacy of substitutions of other lanthanide rare earth series elements for lanthanum, samples were prepared, sintered and diffusion treated in the same manner as the specimens reported in Examples 3–7. In these samples, the lanthanum addition in its precursor form $La_2O_3$ was replaced with an equivalent atomic amount of the following rare earth oxides: $CeO_2$, $Pr_6O_{11}$, $Nd_2O_3$, $Sm_2O_3$, $Gd_2O_3$, $Dy_2O_3$ and $Ho_2O_3$. In addition and because of its known similar properties yttrium, as $Y_2O_3$, was also used. The compositions were all prepared in accordance with the previously determined optimum parameters in the basic formula. Table 8, including for comparative purposes the previously listed La based compositions of Sample Nos. 65–67, shows the results for the seven rare earth substitutions and the yttrium substitution.

TABLE 8

.96SrTiO₃ + .016LnAlO₃ + .016Ln.₆₆TiO₃ + .008LnCrO₃

| Sample No. | Ln | Sintering Conditions | K | D | T | ΔC/C |
|---|---|---|---|---|---|---|
| 65 | La | A | 16,600 | 0.33 | 260 | ±1 |
| 66 | La | B | 12,500 | 0.21 | 560 | +3, −2 |
| 67 | La | C | 16,000 | 0.22 | 350 | +2, −1 |
| 89 | Ce | A | 16,300 | 0.55 | 180 | 0, +3 |
| 90 | Ce | B | 17,600 | 0.35 | 270 | +4, −2 |
| 91 | Ce | C | 22,000 | 0.62 | 200 | 0, +3 |
| 92 | Pr | A | 15,100 | 0.45 | 170 | ±2 |
| 93 | Pr | B | 18,400 | 0.25 | 410 | +5, −3 |
| 94 | Pr | C | 18,500 | 0.46 | 330 | ±2 |
| 95 | Nd | A | 14,900 | 0.27 | 330 | +4, −2 |
| 96 | Nd | B | 16,300 | 0.24 | 360 | +5, −2 |
| 97 | Nd | C | 16,300 | 0.26 | 360 | 0, +3 |
| 98 | Sm | A | 14,200 | 0.17 | 310 | +8, −5 |
| 99 | Sm | B | 12,600 | 0.13 | 560 | +9, −6 |
| 100 | Sm | C | 19,800 | 0.31 | 350 | +7, −4 |
| 101 | Gd | A | 13,700 | 0.24 | 300 | +10, −7 |
| 102 | Gd | B | 10,800 | 0.15 | 480 | +10, −7 |
| 103 | Gd | C | 16,200 | 0.60 | 360 | +9, −5 |
| 104 | Dy | A | 8,300 | 0.26 | 740 | +14, −8 |
| 105 | Dy | B | 10,800 | 0.31 | 480 | +17, −10 |
| 106 | Dy | C | 9,000 | 0.31 | 600 | +14, −8 |
| 107 | Ho | A | 7,300 | 0.34 | 320 | +16, −10 |
| 108 | Ho | B | 6,450 | 0.38 | 420 | +16, −9 |
| 109 | Ho | C | 8,800 | 0.45 | 590 | +17, −10 |
| 110 | Y | A | 7,800 | 0.55 | 340 | +14, −7 |
| 111 | Y | B | 6,900 | 0.35 | 450 | +18, −10 |
| 112 | Y | C | 11,600 | 0.61 | 260 | +16, −7 |

Although certain samples tested indicated slight improvements in one or two of the measured dielectric properties over the La composition of Sample Nos. 65–67, the latter still provides the best overall properties. The most notable good properties were provided by the Ce, Pr and Nd Samples 89–97. The remaining compositions showed a rather dramatic decline in one or more dielectric properties, although all have some utility as capacitor materials. It is noted that the decline in dielectric properties with increasing atomic number in the lanthanide series corresponds to decreasing ionic radii of the elements. For each set of sintering conditions, the dielectric constants and the maximum changes in capacitance with temperature showed a generally uniform decline.

EXAMPLE 9

Various transition metal substitutions were made for chromium in the preferred compositional formulation with x=0.04, y=0.20 and z=0.50. The transition metals were added in their oxide forms: MnO, Fe₂O₃, Co₂O₃, NiO and CuO. These samples are identified and the results of tests made on them are shown in Table 9. Again, the data for the corresponding chromium compound, initially shown in Table 6 as Sample Nos. 65–67, are included for comparison.

TABLE 9

.94SrTiO₃ + .016LaAlO₃ + .016La.₆₆TiO₃ + .008LaMO₃

| Sample No. | M | Sintering Conditions | K | D | T | ΔC/C |
|---|---|---|---|---|---|---|
| 65 | Cr | A | 16,600 | 0.33 | 260 | ±1 |
| 66 | Cr | B | 12,500 | 0.21 | 560 | +3, −2 |
| 67 | Cr | C | 16,000 | 0.22 | 350 | +2, −1 |
| 113 | Mn | A | 9,000 | 4.2 | 4 | — |
| 114 | Mn | B | 11,000 | 5.8 | 1 | — |
| 115 | Mn | C | 13,500 | 6.0 | 3 | — |
| 116 | Fe | A | 15,000 | 0.46 | 640 | −3, +6 |
| 117 | Fe | B | 12,000 | 0.22 | 1,350 | — |
| 118 | Fe | C | 16,000 | 0.54 | 350 | ±6 |
| 119 | Co | A | 13,000 | 0.46 | 230 | −1, +9 |
| 120 | Co | B | 7,300 | 0.26 | 320 | — |
| 121 | Co | C | 16,200 | 0.58 | 220 | −3, +7 |
| 122 | Ni | A | 9,500 | 0.94 | 200 | +5, −4 |
| 123 | Ni | B | 3,300 | 1.0 | 20 | — |
| 124 | Ni | C | 15,300 | 0.45 | 1,020 | ±1 |
| 125 | Cu | A | 7,000 | 0.14 | 100 | +11, −6 |
| 126 | Cu | B | 500 | 1.30 | 2 | — |
| 127 | Cu | C | 13,000 | 0.22 | 1,160 | +8, −5 |

Of the transition metal substitutions tested, Cr, Fe, Co, Ni and Cu showed good dielectric properties for at least one set of sintering conditions. It is believed, however, that manganese would also be a suitible transition metal substitute. Enhanced dielectric constants, but poor overall dielectric properties, were obtained in compositions containing manganese, vanadium, niobium, molybdenum, tantalum and tungsten as partial replacements for Al and Ti. For example, as shown in Table 9, Mn exhibited an acceptable level of dielectric enhancement, although the other properties were deficient. The sintering conditions (A, B and C) under which the reported compositions developed acceptable dielectric properties were not optimized for these materials, consequently, results were not included in Table 9. Modification of the firing conditions would, however, be expected to substantially improve the dielectric behavior of these materials. Particularly good results were uniformly found in the samples sintered under C conditions, Sample Nos. 118, 121, 124, and 127, indicating that lower temperatures and more reducing atmospheres may be satisfactory. Conversely, the more oxidizing atmosphere of sintering conditions B produced generally poor results, however, with the increased temperature of conditions A, the dielectric properties improved. Other transition metals, scandium and zinc, were also examined, but excluded on the basis of high cost and poor performance, respectively.

In accordance with known and accepted procedures in the formulation of ceramic dielectrics, isovalent substitutions were made for strontium and titanium in the SrTiO₃. These substitutions included barium (Ba), calcium (Ca) and lead (Pb) for strontium, and zirconium (Zr) and tin (Sn) for titanium, up to 5.0 mole % in accordance with the formula:

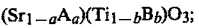

$$(Sr_{1-a}A_a)(Ti_{1-b}B_b)O_3;$$

where A and B represent the isovalent substitutions for Sr and Ti, respectively; and a and b each equal 0 to 0.05. These samples were formulated in the composition having the parameters of x=0.04, y=0 and z=0.50 and 0.15 weight % silica (SiO₂) was included as a sintering aid. Although dielectric enhancement was observed, no substantial improvement in the overall dielectric properties occurred. The value in such substitutions would be in their possible reduction in material costs.

Total molar modifier additions in excess of 6 mole % (x=0.06) up to 16 mole % were made and tested. No general improvement in the dielectric properties was observed and the need for higher sintering temperatures and more reducing atmospheres was apparent.

In summary, grain boundary barrier layer dielectrics made in accordance with the invention disclosed herein are characterized by their excellent temperature stability in capacitor applications. This stability is evidenced by the extremely low changes in capacitance with temperature, some samples being as low as ±1% of the room temperature value for the full range of −55° C. to +125° C. and many being consistently within the range of ±5%. It is believed that the various modifiers or dopants, within the ranges disclosed, tested and hereinafter claimed, affect the dielectric properties in the following manner: (1) lanthanum or other rare earth substitutions are effective in making the dielectric semiconductive; (2) the aluminate provides stability as a grain growth inhibitor and appears to increase resistance values (used in calculating the dielectric relaxation time constant); (3) the titanate promotes desired grain growth; and (4) the chromate or other transition metal substitutions also promote grain development and aid in decreasing the sintering temperatures.

As specified above, the diffusion treatment for insulating the ceramic grain boundaries was done with a fritted electrode material in which the frit was comprised of approximately 84 weight % $Bi_2O_3$ and 14 weight % CdO (and impurities in minute amounts). However, variations in the composition of the frit, including increases in the amount of CdO up to 40 weight % and substitutions of PbO for CdO in these amounts; provided suitable diffusion and grain boundary insulation. In all of the samples tested and reported hereinabove, the insulating barrier layer material was applied in preferred amounts ranging from about 3% to 6% by weight of the ceramic material. However, amounts up to 15% by weight have been used with no adverse effects. The application of the silver electrode material, including the frit, resulted in weight increases in the ceramic specimens ranging from about 15 to 30% (after burning off the electrode ink vehicle). Diffusion firing temperatures in the range of 850° C. to 950° C. provided uniformly good results, however, mid-range temperatures appear to be the best.

I claim:

1. A grain boundary barrier layer ceramic composition consisting essentially of a major amount of sintered strontium titanate and having the formula:

$$(1-x)SrTiO_3 + x(1-y)((1-z)LnAlO_3 + zLn_{0.66}TiO_3) + xyLnMO_3;$$

where Ln is selected from the group consisting of Y, La, Ce, Pr, Nd, Pm, Sm, Eu, Gd, Tb, Dy, Ho, Er, Tm, Yb and Lu; where M is selected from the group consisting of V, Cr, Mn, Fe, Co, Ni, Cu, Nb, Mo, Ta and W; and, where x=0.02 to 0.06, y=0 to 0.50 and z=0 to 1.00; and, having diffused therein a barrier layer material consisting essentially of $Bi_2O_3$ or a mixture of a major amount of $Bi_2O_3$ with the balance comprising CdO or PbO.

2. The composition as defined in claim 1 wherein Ln is selected from the group consisting of Y, La, Ce, Pr, Nd, Sm, Gd, Dy and Ho.

3. The composition as defined in claim 2 wherein M is selected from the group consisting of Cr, Fe, Co, Ni and Cu.

4. The composition as defined in claim 3 wherein said barrier layer material comprises from 3% to 15% by weight of said ceramic.

5. The composition as defined in claim 1 wherein the strontium titanate is modified by substituting for the strontium (Sr) and titanium (Ti), respectively, in the formula $SrTiO_3$, minor amounts of elements selected from the groups consisting of calcium (Ca), barium (Ba) and lead (Pb) and zirconium (Zr) and consisting of tin (Sn), respectively.

6. The composition as defined in claim 5 wherein the substitutions for Sr and Ti are made in accordance with the formula:

$$(Sr_{1-a}A_a)(Ti_{1-b}B_b)O_3;$$

where A is selected from the group consisting of Ca, Ba and Pb and B is selected from the group consisting of Sr and Sn, and where a=0 to 0.05 and b=0 to 0.05.

7. The composition as claimed in claim 3 or 4, wherein Ln is lanthanum and M is chromium.

8. The composition as claimed in claim 7, wherein x is 0.04, y is 0.2, and z is 0.5.

9. The method of manufacturing an intergranular barrier layer ceramic capacitor comprising the steps of:
(a) preparing a ceramic composition having the formula $$(1-x)SrTiO_3 + x(1-y)((1-z)LnAlO_3 + zLn_{0.66}TiO_3) + xyLnMO_3;$$

where Ln is selected from the group consisting of Y, La, Ce, Pr, Nd, Pm, Sm, Eu, Gd, Tb, Dy, Ho, Er, Tm, Yb, and Lu; where M is selected from the group consisting of Cr, Mn, Fe, Co, Ni and Cu; and, where x=0.02 to 0.04, y=0 to 0.50 and z=0 to 1.00;
(b) sintering said composition at a temperature in the range of from 1380° C. to 1500° C. in a reducing atmosphere;
(c) applying a fritted electrode material to said sintered composition, where the frit consists essentially of $Bi_2O_3$ or mixtures of $Bi_2O_3$ with oxides selected from the group consisting of CdO and PbO; and,
(d) firing said electrode material at a temperature in the range of from 850° C. to 950° C. to cause said frit to diffuse into the grain boundaries of said sintered composition.

10. The method of claim 9 wherein Ln is selected from the group consisting of Y, La, Ce, Pr, Nd, Sm, Gd, Dy and Ho.

11. The method of claim 10 wherein said ceramic composition is sintered at a temperature in the range of from 1380° C. to 1430° C.

12. The method of claim 11 wherein said electrode material is fired at a temperature in the range of from 875° C. to 950° C.

13. The method of claim 12 wherein said frit comprises from 3% to 15% by weight of said ceramic composition.

* * * * *